Patented Oct. 15, 1929

1,732,016

UNITED STATES PATENT OFFICE

FELIX HOMBERG AND MAX LANDECKER, OF BARMEN, GERMANY, ASSIGNORS TO AMERICAN NUPLAX CORPORATION, OF NEW YORK, N. Y., A CORPORATION OF DELAWARE

PROCESS FOR THE PRODUCTION OF MOLDED MASSES FROM BLOOD

No Drawing. Application filed May 20, 1926, Serial No. 110,543, and in Germany July 7, 1925.

In a copending patent application Serial No. 110,542, filed May 20th, 1926, by Felix Homberg, and Max Landecker is described the moistening of native dry blood (blood albumen) i. e. water soluble dry blood, and it is explained that water soluble additions, either to the blood before moistening, or to the moistening water, are necessary in order to render the moistening, or thorough moistening practically possible.

It has now been found that a variation in the behavior of this water soluble dry blood, as regards the possibility of thoroughly moistening it, occurs when not water soluble filling media, and particularly inorganic filling media, such as lithopone, zinc white, magnesium oxide, and the like, have been added.

If water soluble dry blood is intimately mixed, for example, with 5% by weight of zinc white the difficulties in moistening referred to in the above application, no longer exist. In this case, water to the amount of, for example 15% by weight, is absorbed without any sticky lumps being formed, and the water can be easily distributed throughout the entire mass, by usual commercial mixing methods.

For the production of colored molded masses, according to patent application Serial No. 74,399 filed December 9, 1925 by Felix Homberg, this property of the filled water soluble dry blood is of great advantage.

This patent application discloses a process for the manufacture from bood of a solid body or article capable of being colored which comprises, intimately mixing a mass of blood with white inorganic material, subjecting the mixture having but a small moisture content to heat and pressure and then treating the body or article formed as a product of the first two steps with a suitable coloring medium.

*Example for carrying out the invention*

95 kgs. of native (water soluble) dry blood were intimately mixed with 5 kgs. of zinc white, for a period of five hours in a mixing drum of a usual construction. Then 15% by weight of water was added to the mixture and the whole mixture was mixed for four hours in the said drum. The resulting material was powderlike, and resembled sea-sand. This powder was then filled into molds and pressed in hydraulic presses under 200 atms. pressure and at a temperature of 105° C., for one and one-half minutes. After cooling, the molded article was hardened with formaldehyde solution in the usual manner.

What we claim is:—

1. The process for the production of molded masses from dry water-soluble blood powder, comprising rendering the blood powder susceptible to the uniform distribution throughout its mass of a small proportion of water, by mixing with the dry blood powder a non-water-soluble powder, thoroughly mixing with the mixture a proportion of water so small as to retain the powder-like characteristic of the mixture and hot molding the mixture.

2. The process for the production of molded masses from dry water-soluble blood powder, comprising rendering the blood powder susceptible to the uniform distribution throughout its mass of a small proportion of water, by mixing with the dry blood powder a non-water-soluble inorganic powder, thoroughly mixing with the mixture a proportion of water so small as to retain the powder-like characteristic of the mixture and hot molding the mixture.

3. The process for the production of molded masses from dry water-soluble blood powder, comprising rendering the blood powder susceptible to the uniform distribution throughout its mass of a small proportion of water, by mixing with the dry blood powder a non-water-soluble powder, thoroughly incorporating with the mixture water in the proportion of substantially 15% of the mixture, so that the powder-like nature of the mixture is preserved, and hot molding the mixture.

In testimony whereof we have signed our names to this specification.

FELIX HOMBERG.
MAX LANDECKER.